(12) United States Patent
Wang et al.

(10) Patent No.: US 12,216,501 B2
(45) Date of Patent: Feb. 4, 2025

(54) FLEXIBLE DISPLAY DEVICES

(71) Applicant: BOE Technology Group Co., Ltd., Beijing (CN)

(72) Inventors: Zifeng Wang, Beijing (CN); Hongbo Feng, Beijing (CN); Yushun Jie, Beijing (CN); Yan Ren, Beijing (CN); Yunpeng Wu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 186 days.

(21) Appl. No.: 17/916,129

(22) PCT Filed: Oct. 26, 2021

(86) PCT No.: PCT/CN2021/126501
§ 371 (c)(1),
(2) Date: Sep. 30, 2022

(87) PCT Pub. No.: WO2022/193664
PCT Pub. Date: Sep. 22, 2022

(65) Prior Publication Data
US 2023/0142005 A1     May 11, 2023

(30) Foreign Application Priority Data
Mar. 17, 2021 (CN) .......................... 202110287606.8

(51) Int. Cl.
*G06F 1/16* (2006.01)
*G09F 9/30* (2006.01)

(52) U.S. Cl.
CPC .......... *G06F 1/1652* (2013.01); *G06F 1/1601* (2013.01); *G06F 1/1675* (2013.01); *G09F 9/301* (2013.01)

(58) Field of Classification Search
CPC .... G06F 1/1652; G06F 1/1601; G06F 1/1675; G09F 9/301; G09F 9/30
See application file for complete search history.

(56) References Cited

U.S. PATENT DOCUMENTS 7,184,086 B2 * 2/2007 Tamura ................ H04N 23/531
                                                                             348/E5.025
9,743,542 B2 * 8/2017 Heo ........................ H05K 1/028
(Continued)

FOREIGN PATENT DOCUMENTS

CN        108064404 A     5/2018
CN        110233918 A     9/2019
(Continued)

OTHER PUBLICATIONS

PCT/CN2021/126501 international search report.
PCT/CN2021/126501 Written Opinion.

*Primary Examiner* — Rockshana D Chowdhury
(74) *Attorney, Agent, or Firm* — IPro, PLLC (57) ABSTRACT

A flexible display device (100). The flexible display device (100) includes a flexible display panel (10), an auxiliary structure (20), a first reel (325), and a driving unit (30). The flexible display panel (10) includes a first end (11) and a second end (12). The auxiliary structure (20) includes a third end and a fourth end, and the fourth end is connected with the second end (12). The first reel (325) is connected with the first end (11). When driving the flexible display panel (10) to switch from an unrolled state to a rolled state and driving the auxiliary structure to switch from an unfolded state to a folded state, the driving unit (30) drives the fourth end to move close to the first reel (325) and the first reel (325) to rotate, so as to drive the second end (12) to move close to the first reel (325). When driving the flexible display panel (10) to switch from the rolled state to the unrolled state and driving the auxiliary structure (20) to switch from the (Continued)

folded state to the unfolded state, the driving unit (30) drives the first reel (325) to rotate to unwind the flexible display panel (10) from the first reel (325), and drives the fourth end to move away from the first end (11), so as to drive the second end (12) to move away from the first reel (325).

10 Claims, 7 Drawing Sheets

(56) References Cited

U.S. PATENT DOCUMENTS

| | | | | |
|---|---|---|---|---|
| 9,756,757 B2* | 9/2017 | Park | ............. | H05K 7/16 |
| 10,748,456 B2* | 8/2020 | Pyo | ............. | G09F 15/0062 |
| 10,789,863 B2* | 9/2020 | Song | ............. | H05K 1/189 |
| 10,976,778 B2* | 4/2021 | Pyo | ............. | G09F 9/301 |
| 11,003,217 B2* | 5/2021 | Cha | ............. | G06F 1/1681 |
| 11,013,130 B2* | 5/2021 | Shin | ............. | G02F 1/133305 |
| 11,057,707 B2* | 7/2021 | Kim | ............. | H04R 9/045 |
| 11,089,700 B2* | 8/2021 | Kang | ............. | H05K 5/0017 |
| 11,127,320 B2* | 9/2021 | Park | ............. | H02K 33/02 |
| 11,558,969 B2* | 1/2023 | Kim | ............. | G09F 9/301 |
| 11,576,270 B2* | 2/2023 | Rha | ............. | G06F 1/1652 |
| 11,589,486 B2* | 2/2023 | Yoon | ............. | H05K 5/0017 |
| 11,632,866 B2* | 4/2023 | Pyo | ............. | H02K 7/1166 |
| | | | | 361/807 |
| 11,675,392 B2* | 6/2023 | Park | ............. | G06F 1/1698 |
| | | | | 361/679.01 |
| 11,678,446 B2* | 6/2023 | Song | ............. | H05K 5/0217 |
| | | | | 361/688 |
| 11,699,366 B2* | 7/2023 | Song | ............. | G06F 1/1652 |
| | | | | 361/679.01 |
| 11,730,288 B2* | 8/2023 | Luo | ............. | G09F 15/0012 |
| | | | | 361/807 |
| 11,812,565 B2* | 11/2023 | Seki | ............. | G09F 9/301 |
| 11,839,039 B2* | 12/2023 | Han | ............. | G02F 1/133322 |
| 11,869,391 B2* | 1/2024 | Lee | ............. | G09F 9/301 |
| 11,907,015 B2* | 2/2024 | Song | ............. | G09F 9/301 |
| 11,984,051 B2* | 5/2024 | Park | ............. | G02F 1/133314 |
| 2009/0302176 A1* | 12/2009 | Kuroi | ............. | F16M 11/26 |
| | | | | 248/176.1 |
| 2009/0308997 A1 | 12/2009 | Policar | | |
| 2014/0268532 A1* | 9/2014 | Nicol | ............. | G09F 15/0062 |
| | | | | 361/749 |
| 2016/0374228 A1* | 12/2016 | Park | ............. | G09F 9/301 |
| 2017/0156219 A1* | 6/2017 | Heo | ............. | G06F 1/1679 |
| 2019/0198783 A1* | 6/2019 | Kim | ............. | H01L 27/156 |
| 2020/0013317 A1* | 1/2020 | Cho | ............. | H05K 5/0217 |
| 2020/0022269 A1 | 1/2020 | Liao | | |
| 2020/0089279 A1* | 3/2020 | Liao | ............. | G09F 11/18 |
| 2020/0201394 A1* | 6/2020 | Choi | ............. | H05K 5/0017 |
| 2020/0253069 A1* | 8/2020 | Cha | ............. | G06F 1/1681 |
| 2022/0253104 A1* | 8/2022 | Luo | ............. | G06F 1/1652 |
| 2022/0264755 A1* | 8/2022 | Park | ............. | G09F 9/301 |
| 2022/0317736 A1* | 10/2022 | Li | ............. | G06F 1/1624 |
| 2022/0322550 A1* | 10/2022 | Yin | ............. | H05K 5/0217 |
| 2023/0007950 A1* | 1/2023 | Chang | ............. | G09F 9/301 |
| 2023/0122526 A1* | 4/2023 | Dong | ............. | G06F 1/1652 |
| | | | | 361/679.27 |
| 2023/0132282 A1* | 4/2023 | Kim | ............. | G06F 1/1601 |
| | | | | 361/679.01 |
| 2023/0164936 A1* | 5/2023 | Kang | ............. | G09F 9/301 |
| | | | | 361/807 |

FOREIGN PATENT DOCUMENTS

| | | |
|---|---|---|
| CN | 110428734 A | 11/2019 |
| CN | 210181960 U | 3/2020 |
| CN | 111047995 A | 4/2020 |
| FR | 2890150 A1 | 3/2007 |

* cited by examiner

FLEXIBLE DISPLAY DEVICES

CROSS-REFERENCE TO RELATED APPLICATIONS

This application is the U.S. national phase of PCT Application No. PCT/CN2021/126501 filed on Oct. 26, 2021, which claims priority to Chinese Patent Application No. 202110287606.8 filed on Mar. 17, 2021, both of which are incorporated herein by reference in their entireties.

TECHNICAL FIELD

The present application relates to the field of display technology, and in particular to a flexible display device.

BACKGROUND

Rollable flexible display devices have a small volume in a rolled state and are convenient for users to carry, and are widely used in many electronic devices such as mobile communication terminals, tablet computers, e-books, and navigation devices.

A flexible display panel of the flexible display device is more flexible, and is prone to unevenness or distortion in an unfolded state, which affects the user experience.

SUMMARY

Embodiments of the present application provide a flexible display device, including:
  a flexible display panel having an unrolled state and a rolled state, the flexible display panel including a first end and a second end opposite to the first end;
  an auxiliary structure having an unfolded state and a folded state, the auxiliary structure including a third end and a fourth end opposite to the third end, and the fourth end being connected with the second end;
  a first reel, connected with the first end; and
  a driving unit, where when driving the flexible display panel to switch from the unrolled state to the rolled state and driving the auxiliary structure to switch from the unfolded state to the folded state, the driving unit drives the fourth end to move close to the first reel, and drives the first reel to rotate to drive the second end to move close to the first reel and to wind the flexible display panel around the first reel; and when driving the flexible display panel to switch from the rolled state to the unrolled state and driving the auxiliary structure to switch from the folded state to the unfolded state, the driving unit drives the first reel to rotate to unwind the flexible display panel wound around the first reel from the first reel, and drives the fourth end to move away from the first end to drive the second end to move away from the first reel.

In an embodiment, the auxiliary structure includes a rod portion, the flexible display device further includes a fixed shaft, and the rod portion is rotatable around the shaft; and
  when driving the auxiliary structure to switch to the unfolded state, the driving unit drives the rod portion to rotate around the shaft to move a fourth end of the rod portion away from the first reel; and when driving the auxiliary structure to switch to the folded state, the driving unit drives the rod portion to rotate around the shaft to move the fourth end of the rod portion close to the first reel.

In an embodiment, the flexible display device further includes a connecting rod provided with a straight slot, and the fourth end of the rod portion is movably and rotatably connected with the straight slot; and the second end is connected with the connecting rod, and the fourth end of the rod portion is connected with the second end through the connecting rod; and
  when the fourth end of the rod portion moves away from or close to the first reel, the fourth end of the rod portion moves and rotates relative to the straight slot, to drive the connecting rod to move away from or close to the first reel.

In an embodiment, the rod portion is provided with a strip-shaped slot, the shaft passes through the strip-shaped slot, and the strip-shaped slot is movable and rotatable relative to the shaft;
  when driving the auxiliary structure to switch to the folded state, the driving unit drives the strip-shaped slot to rotate and move relative to the shaft to increase a distance between a third end of the rod portion and the shaft, so as to drive the fourth end of the rod portion to move close to the first reel; and
  when driving the auxiliary structure to switch to the unfolded state, the driving unit drives the strip-shaped slot to rotate and move relative to the shaft to decrease the distance between the third end of the rod portion and the shaft, so as to drive the fourth end of the rod portion to move away from the first reel.

In an embodiment, in an extension direction of the rod portion, a distance between an end of the strip-shaped slot close to the third end of the rod portion and the third end of the rod portion is smaller than a distance between an end of the strip-shaped slot away from the third end of the rod portion and the fourth end of the rod portion.

In an embodiment, the rod portion includes a first rod portion and a second rod portion that cross each other, and the shaft passes through the strip-shaped slot of the first rod portion and the strip-shaped slot of the second rod portion;
  when driving the auxiliary structure to switch to the folded state, the driving unit drives the strip-shaped slot of the first rod portion and the strip-shaped slot of the second rod portion to rotate and move relative to the shaft to increase a distance between a third end of the first rod portion and the shaft, a distance between a third end of the second rod portion and the shaft, and a distance between the third end of the first rod portion and the third end of the second rod portion, so as to drive a fourth end of the first rod portion and a fourth end of the second rod portion to move close to the first reel; and
  when driving the auxiliary structure to switch to the unfolded state, the driving unit drives the strip-shaped slot of the first rod portion and the strip-shaped slot of the second rod portion to rotate and move relative to the shaft to decrease the distance between the third end of the first rod portion and the shaft, the distance between the third end of the second rod portion and the shaft, and the distance between the third end of the first rod portion and the third end of the second rod portion, so as to drive the fourth end of the first rod portion and the fourth end of the second rod portion to move away from the first reel.

In an embodiment, the driving unit includes a first motor, a transmission member and a connector, the connector is rotatably connected with a third end of the rod portion, and the connector is cooperated with the transmission member; and the first motor drives the transmission member to rotate, the transmission member drives the connector to move relative to the shaft, and the connector drives the third end of the rod portion to move relative to the shaft.

In an embodiment, the flexible display device further includes an accommodating unit, in which the shaft, the first reel, and the third end are accommodated; and the flexible display device further includes a jointing rod that is fixedly connected with the shaft, and the shaft is fixedly mounted in the accommodating unit through the jointing rod; and at least two mounting holes are provided in the jointing rod, the flexible display device further includes connecting pieces corresponding to the mounting holes one-to-one, and each of the connecting pieces passes through a respective mounting hole to fix the jointing rod in the accommodating unit.

In an embodiment, the flexible display device further includes a flexible backplane having an unrolled state and a rolled state; and the driving unit drives the flexible backplane to switch between the rolled state and the unrolled state; and when the flexible backplane and the flexible display panel are in the unrolled state, the auxiliary structure is located between the flexible backplane and the flexible display panel.

In an embodiment, the flexible display device further includes a second reel, and the driving unit includes a power assembly including a second motor, a first gear, and a second gear; an end of the flexible backplane is connected with the second reel; the first gear engages with the second gear, the first gear drives the first reel to rotate, and the second gear drives the second reel to rotate; and the second motor drives one of the first gear and the second gear to rotate; and the second motor operates to drive the first gear and the second gear to rotate, and in turn drive the first reel and the second reel to rotate, to wind the flexible display panel in the unrolled state around the first reel, and to wind the flexible backplane in the unrolled state around the second reel, or to unwind the flexible display panel wound around the first reel from the first reel, and to unwind the flexible backplane wound around the second reel from the second reel.

In an embodiment, the flexible display device further includes zipper assemblies respectively provided on opposite sides of the flexible display panel; each of the zipper assemblies includes a first zipper chain, a second zipper chain, and a fixed lock catch, the first zipper chain is disposed on a side edge of the flexible display panel, and the second zipper chain is disposed on a side edge of the flexible backplane;

when simultaneously driving the flexible display panel and the flexible backplane to switch from the unrolled state to the rolled state, the driving unit drives the first zipper chain and the second zipper chain to roll so as to move relative to the lock catch, such that the lock catch separates the first zipper chain and the second zipper chain in a fastened state; and when simultaneously driving the flexible display panel and the flexible backplane to switch from the rolled state to the unrolled state, the driving unit drives the first zipper chain and the second zipper chain in a rolled state to unroll so as to move relative to the lock catch, such that the lock catch fastens the first zipper chain and the second zipper chain.

In an embodiment, the flexible display device further includes an accommodating unit, in which the first reel and the third end are accommodated; and when the flexible display panel is in the rolled state and the auxiliary structure is in the folded state, the flexible display panel, the driving unit and the auxiliary structure are accommodated in the accommodating unit; and when the flexible display panel is in the unrolled state and the auxiliary structure is in the unfolded state, the flexible display panel and the auxiliary structure are at least partially exposed from the accommodating unit, and the driving unit is accommodated in the accommodating unit.

Embodiments of the present application mainly provide the following technical effects.

With the flexible display device according to the embodiments of the present application, when the driving unit drives the flexible display panel to switch to the unrolled state and drives the auxiliary structure to switch to the unfolded state, the fourth end of the auxiliary structure drives the second end of the flexible display panel to move away from the first reel, resulting in a high evenness of the flexible display panel in the unrolled state, which can avoid unevenness or distortion of the flexible display panel during unrolling due to its high flexibility, and help to improve the user experience. When the driving unit drives the flexible display panel to switch to the rolled state and drives the auxiliary structure to switch to the folded state, the flexible display panel is wound around the first reel, which can make the flexible display device smaller in volume and convenient for users to carry.

DETAILED DESCRIPTION OF THE EMBODIMENTS

Exemplary embodiments will be described in detail herein, and examples thereof are illustrated in the drawings.

When the following description relates to the drawings, the same numbers in different drawings indicate the same or similar elements, unless otherwise indicated. Embodiments described in the following exemplary embodiments do not represent all embodiments in accordance with the present application. Rather, they are merely examples of apparatuses and methods in accordance with some aspects of the present application as detailed in the appended claims.

Terms used in the present application are only for the purpose of describing specific embodiments, and are not intended to limit the present application. Singular forms of "a", "said", and "the" used in the present application and the appended claims are also intended to include plural forms, unless the context clearly indicates otherwise. It should also be understood that the term "and/or" as used herein refers to and includes any or all possible combinations of one or more of the associated listed items.

It should be understood that though terms "first", "second", "third", etc. may be used in the present application to describe various information, such information should not be limited by these terms. These terms are only used to distinguish the same type of information from each other. For example, without departing from the scope of the present application, first information may also be referred to as second information, and similarly, second information may also be referred to as first information. Depending on the context, the word "if" as used herein may be interpreted as "when", "upon" or "in response to determining".

Embodiments of the present application provide a flexible display device. The flexible display device in the embodiments of the present application will be described in detail below in conjunction with the drawings. Features in the embodiments described below may complement each other or be combined with each other without conflict.

Embodiments of the present application provide a flexible display device. Referring to FIGS. 1 to 5, the flexible display device 100 includes a flexible display panel 10, an auxiliary structure 20, a first reel 325, and a driving unit 30.

The flexible display panel 10 has an unrolled state and a rolled state. In the flexible display device 100 shown in FIG. 1, the flexible display panel 10 is in the unrolled state, and the flexible display device may be in a display state at this time. In the flexible display device 100 shown in FIG. 2, the flexible display panel 10 is in the rolled state. The flexible display panel 10 includes a first end 11 and a second end 12 opposite to the first end 11.

The auxiliary structure 20 has an unfolded state and a folded state. The auxiliary structure 20 includes a third end and a fourth end opposite to the third end, and the fourth end is connected with the second end 12. In the flexible display device 100 shown in FIGS. 1 and 3, the auxiliary structure 20 is in the unfolded state. In the flexible display device 100 shown in FIGS. 2 and 4, the auxiliary structure 20 is in the folded state.

The first reel 325 is connected with the first end 11. When driving the flexible display panel 10 to switch from the unrolled state to the rolled state and driving the auxiliary structure 20 to switch from the unfolded state to the folded state, the driving unit 30 drives the fourth end of the auxiliary structure 20 to move close to the first reel 325, and drives the first reel 325 to rotate to drive the second end 12 to move close to the first reel 325 and to wind the flexible display panel 10 around the first reel 325. It should be noted that the rotation of the first reel 325 and the movement of the fourth end of the auxiliary structure 20 close to the first reel 325 may both drive the second end of the flexible display panel to move close to the first reel 325. When driving the flexible display panel 10 to switch from the rolled state to the unrolled state and driving the auxiliary structure 20 to switch from the folded state to the unfolded state, the driving unit 30 drives the first reel 325 to rotate to unwind the flexible display panel 10 wound around the first reel 325 from the first reel 325, and drives the fourth end to move away from the first end 11 to drive the second end 12 to move away from the first end 11.

With the flexible display device 100 according to the embodiments of the present application, when the driving unit 30 drives the flexible display panel 10 to switch to the unrolled state and drives the auxiliary structure 20 to switch to the unfolded state, the fourth end of the auxiliary structure 20 drives the second end 12 of the flexible display panel 10 to move away from the first reel 325, and the auxiliary structure 20 applies a tensile force to the flexible display panel 10, resulting in a high evenness of the flexible display panel in the unrolled state, which can avoid unevenness or distortion of the flexible display panel during unrolling due to its high flexibility, and help to improve the user experience. When the driving unit 30 drives the flexible display panel 10 to switch to the rolled state and drives the auxiliary structure 20 to switch to the folded state, the flexible display panel 10 is wound around the first reel 325, which can make the flexible display device 100 smaller in volume and convenient for users to carry.

A distance between the third end of the auxiliary structure 20 and the first reel 325 is small. The auxiliary structure 20 includes a rod portion 201 (which will be described in detail below). In the unfolded state of the auxiliary structure 20, a distance between a third end of the rod portion 201 and the first reel 325 is smaller than a distance between a fourth end of the rod portion 201 and the first reel 325. The auxiliary structure 20 is made of a hard material.

In an embodiment, in the unfolded state of the auxiliary structure 20, only the first end of the flexible display panel 10 is connected with the first reel 325, and other areas of the flexible display panel 10 are all separated from the first reel 325. A distance between the fourth end of the auxiliary structure 20 and the first reel 325 is equal to a size of the flexible display panel 10 in a second direction (which will be described later) in the unrolled state thereof, such that the flexible display panel 10 has a high evenness without wrinkles in the unrolled state thereof.

The first end 11 of the flexible display panel 10 is connected with the first reel 325. The first reel 325 rotates to wind the flexible display panel 10 around the first reel 325, or to unwind the flexible display panel 10 from the first reel 325. The second end 12 of the flexible display panel 10 is driven to move by the cooperation between the auxiliary structure 20 and the first reel 325, thereby enabling the flexible display panel 10 to be switched between the unrolled state and the rolled state. A rotation direction of the first reel 325 when the flexible display panel 10 is switched from the rolled state to the unrolled state is opposite to a rotation direction of the first reel 325 when the flexible display panel 10 is switched from the unrolled state to the rolled state.

The flexible display panel 10 has a fixed size in an extension direction of the flexible display panel 10 at the first end 11 (hereinafter referred to as a first direction), when the flexible display panel 10 is in the unrolled state and in the rolled state. In an extension direction of a side edge of the flexible display panel 10 in the unrolled state (hereinafter referred to as a second direction, which is perpendicular to the first direction), the flexible display panel 10 has different sizes in the unrolled state and in the rolled state. The size of the flexible display panel 10 in the second direction when in the rolled state is smaller than that of the flexible display panel 10 in the second direction when in the unrolled state. Space occupied by the flexible display panel 10 in the unrolled state is more than that occupied by the flexible display panel 10 in the rolled state. A size of the auxiliary structure 20 in the second direction when in the unfolded state is larger than that of the auxiliary structure 20 in the second direction when in the folded state. Space occupied by the auxiliary structure 20 in the unfolded state is more than that occupied by the auxiliary structure 20 in the folded state.

In an embodiment, the flexible display device 100 further includes an accommodating unit 40. The first reel 325, the driving unit 30, and the third end of the auxiliary structure 20 may always be accommodated in the accommodating unit 40. When the flexible display panel 10 is in the rolled state and the auxiliary structure 20 is in the folded state, the flexible display panel 10, the driving unit 30, and the auxiliary structure 20 are accommodated in the accommodating unit 40. When the flexible display panel 10 is in the unrolled state and the auxiliary structure 20 is in the unfolded state, the flexible display panel 10 and the auxiliary structure 20 are at least partially exposed from the accommodating unit 40. In this way, when the flexible display device is not displaying, the flexible display panel 10, the driving unit 30, and the auxiliary structure 20 are accommodated in the accommodating unit 40. The driving unit 30 is accommodated in the accommodating unit when the flexible display device is not displaying, which helps to improve the aesthetics of the flexible display device 100. The accommodating unit 40 may be provided with an opening through which the flexible display panel 10 and the auxiliary structure 20 are exposed from the accommodating unit 40. And, the first end of the flexible display panel 10 is always accommodated in the accommodating unit 40, and the second end moves relative to the accommodating unit 40 to enable the switch between the unrolled state and the rolled state, that is, the flexible display panel is enabled to switch between the unrolled state and the rolled state by moving to one side.

In an embodiment, the accommodating unit 40 is assembled from a first housing 41 and a second housing 42. This facilitates the mounting of the driving unit 30, the third end of the auxiliary structure 20, the first reel 325, and the first end of the flexible display panel 10 in the accommodating unit 40, thereby reducing the complexity of assembly.

Figure 1:
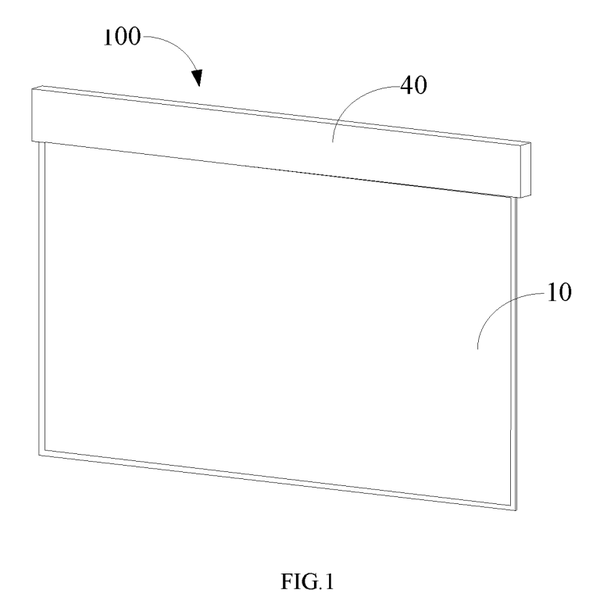
FIG. 1 is a schematic structural diagram of a flexible display device according to an exemplary embodiment of the present application when a flexible display panel is in an unrolled state.
Figure 2:
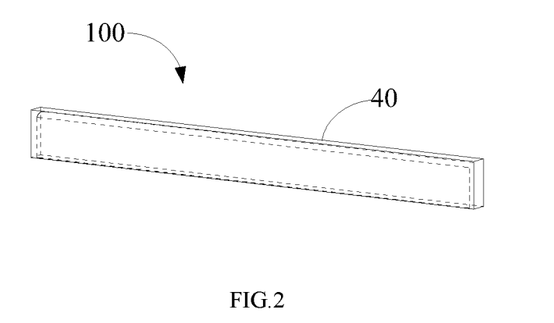
FIG. 2 is a schematic structural diagram of a flexible display device according to an exemplary embodiment of the present application when a flexible display panel is in a rolled state.
Figure 3:
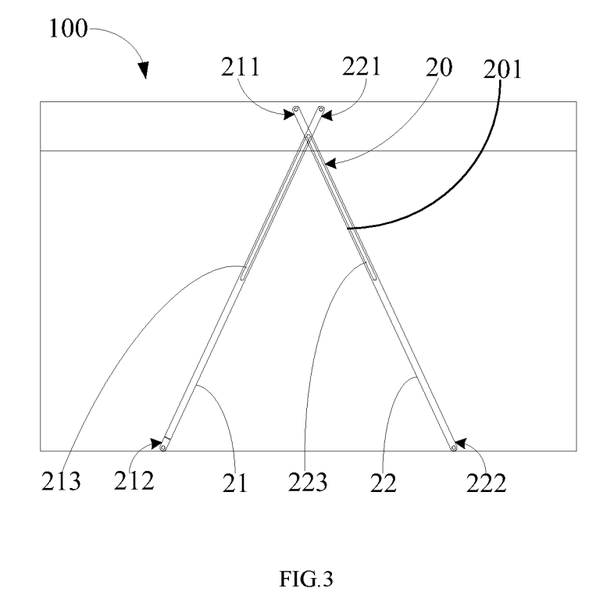
FIG. 3 is a schematic structural diagram of an auxiliary structure according to an exemplary embodiment of the present application in an unfolded state.
Figure 4:
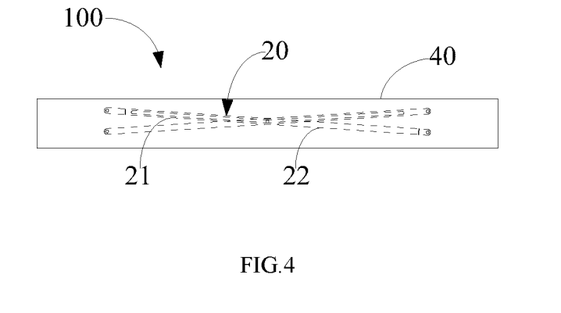
FIG. 4 is a schematic structural diagram of an auxiliary structure according to an exemplary embodiment of the present application in a folded state.
Figure 5:
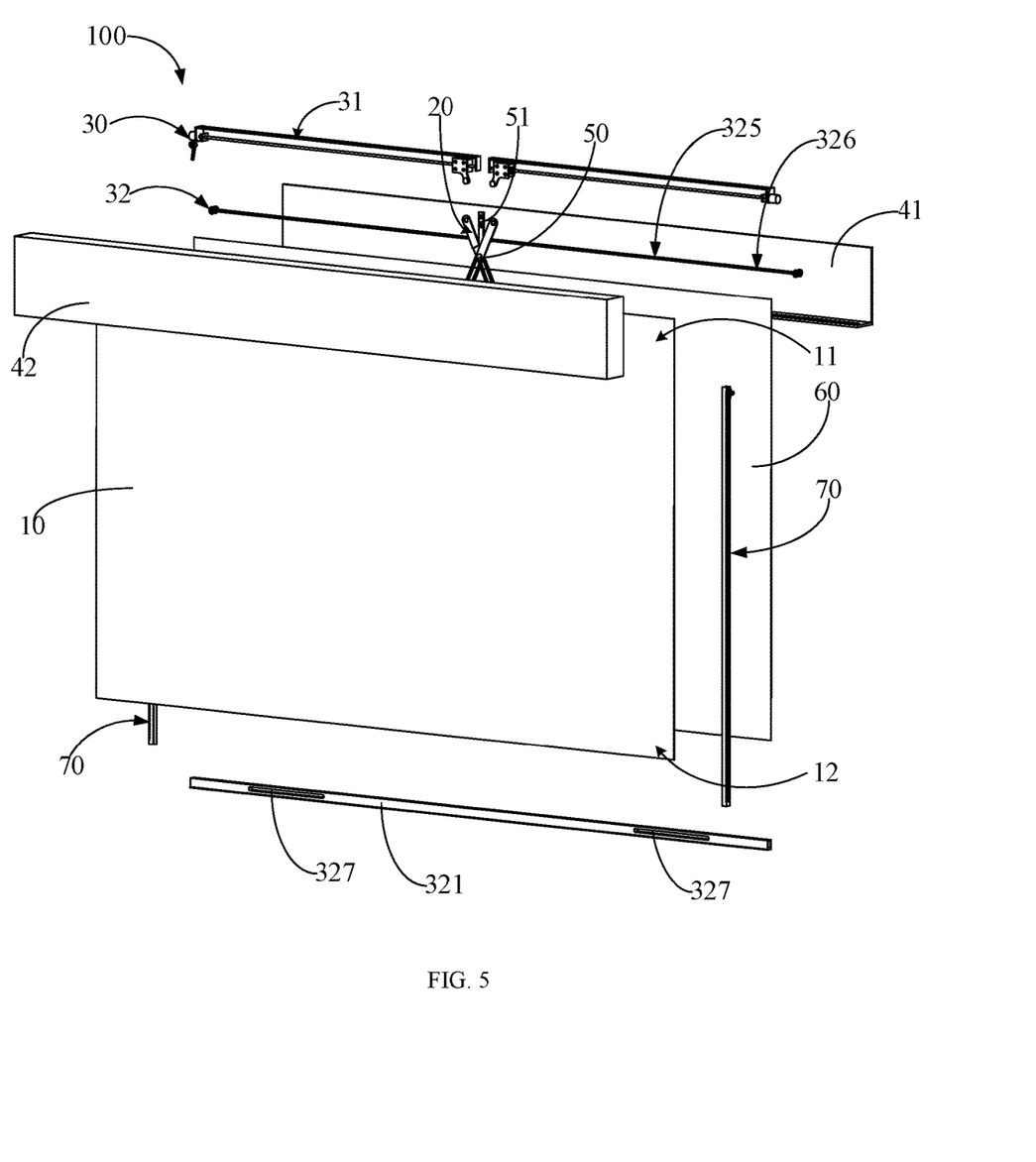
FIG. 5 is a schematic exploded view of a structure of a flexible display device according to an exemplary embodiment of the present application.

In an embodiment, referring to FIG. 5, the flexible display device 100 further includes a fixed shaft 50, the shaft 50 may be fixedly mounted in the accommodating unit 40, and the shaft 50 is not rotatable and movable relative to the accommodating unit 40. The flexible display device 100 further includes a jointing rod 51 fixedly connected with the shaft 50, and the shaft 50 is fixedly mounted in the accommodating unit 40 through the jointing rod 51. The jointing rod 51 may be provided with at least two mounting holes, the flexible display device 100 further includes connecting pieces corresponding to the mounting holes one-to-one, and each connecting piece passes through a respective mounting hole to fix the jointing rod 51 in the accommodating unit 40. The connecting piece may be, for example, a screw. In some embodiments, the shaft 50 is fixed to the first housing 41 of the accommodating unit 40 through the jointing rod 51. The jointing rod 51 may be provided with two mounting holes.

The auxiliary structure 20 includes the rod portion 201 which is rotatable around the shaft 50. The third end of the rod portion 201 is connected with the driving unit 30. The third end of the rod portion 201 is close to the first end of the flexible display panel 10. The auxiliary structure includes the rod portion 201 which includes the third end and the fourth end.

When the driving unit 30 drives the auxiliary structure 20 to switch to the unfolded state, the rod portion 201 is driven to rotate around the shaft 50 such that the fourth end of the rod portion 201 moves away from the first reel 325. When the driving unit drives the auxiliary structure 20 to switch to the folded state, the rod portion 201 is driven to rotate around the shaft 50 such that the fourth end of the rod portion 201 moves close to the first reel 325.

When the flexible display panel 10 is switched to the unrolled state and the auxiliary structure 20 is switched to the unfolded state, the fourth end of the rod portion 201 drives the second end 12 of the flexible display panel 10 to move away from the first reel 325, such that the flexible display panel 10 may be unrolled. In this way, the rod portion 201 has an increased size in the second direction, which drives an increase in the size of the flexible display panel 10 in the second direction, such that the flexible display panel 10 may have a high evenness in the unrolled state. When the flexible display panel 10 is switched to the rolled state and the auxiliary structure 20 is switched to the folded state, the fourth end of the rod portion 201 moves close to the first reel 325, while the second end 12 of the flexible display panel 10 moves close to the first reel 325, such that the sizes of both the flexible display panel 10 and the rod portion 201 in the second direction may be reduced, thereby reducing the volume of the flexible display device.

In an embodiment, the auxiliary structure 20 includes at least two rod portions 201. In this way, the fourth ends of the two rod portions 201 together drive the second end 12 of the flexible display panel 10 to move, which is more helpful to improve the evenness of the flexible display panel 10 in the unrolled state.

In an embodiment, the flexible display device 100 further includes a connecting rod 321 provided with a straight slot 327, and the fourth end of the rod portion 201 is movably and rotatably connected with the straight slot 327. The second end 12 is connected with the connecting rod 321, and the fourth end of the rod portion 201 is connected with the second end 12 through the connecting rod 321. As the fourth end of the rod portion 201 moves away from or close to the first reel 325, the fourth end of the rod portion 201 moves and rotates relative to the straight slot 327. The straight slot 327 extends in the same direction as the connecting rod 321. The connecting rod 321 is made of an inflexible material such as metal or plastic.

In this way, when the fourth end of the rod portion 201 moves away from or close to the first reel 325, the fourth end of the rod portion 201 moves and rotates relative to the connecting rod 321 to drive the connecting rod 321 to move away from or close to the first reel 325, and the second end of the flexible display panel 10 moves along with the connecting rod 321. Since the second end 12 is connected with the connecting rod 321, the second end of the flexible display panel 10 may not move relative to the connecting rod 321 when the rod portion 201 moves relative to the connecting rod 321, and the flexible display panel may not wrinkle, which can avoid wrinkles of the flexible display panel 10 due to movement of the rod portion 201 when the fourth end is directly connected with the second end 12.

In an embodiment, the rod portion 201 is provided with a strip-shaped slot through which the shaft 50 passes, and the strip-shaped slot is movable and rotatable relative to the shaft 50. When driving the auxiliary structure 20 to switch to the folded state, the driving unit 30 drives the strip-shaped slot to rotate and move relative to the shaft, such that the distance between the third end of the rod portion 201 and the shaft 50 increases, which drives the fourth end of the rod portion 201 to move close to the first reel 325. When driving the auxiliary structure 20 to switch to the unfolded state, the driving unit 30 drives the strip-shaped slot to rotate and move relative to the shaft 50, such that the distance between the third end of the rod portion 201 and the shaft 50 decreases, which drives the fourth end of the rod portion 201 to move away from the first reel 325.

By providing the strip-shaped slot in the rod portion 201, the distance between the shaft 50 and the third end of the rod portion 201 increases and the distance between the shaft 50 and the fourth end of the rod portion 201 decreases when the auxiliary structure 20 is switched to the folded state, such that a distance between the third end or the fourth end of the rod portion 201 and an edge of the flexible display panel on the same side may be smaller. This can avoid a larger volume of the flexible display device in the rolled state due to a large distance between the third end or the fourth end of the rod portion 201 and an edge of the flexible display panel on the same side, which helps to reduce the volume of the flexible display device when the flexible display panel is in the rolled state.

In an embodiment, in an extension direction of the rod portion 201, a distance between an end of the strip-shaped slot close to the third end of the rod portion 201 and the third end of the rod portion 201 is smaller than a distance between an end of the strip-shaped slot away from the third end of the rod portion 201 and the fourth end of the rod portion 201. When the auxiliary structure 20 is switched to the unfolded state, the strip-shaped slot moves relative to the shaft 50, such that the end of the strip-shaped slot close to the third end moves close to the shaft 50. By setting the distance between the end of the strip-shaped slot close to the third end of the rod portion 201 and the third end of the rod portion 201 to be smaller than the distance between the end of the strip-shaped slot away from the third end of the rod portion 201 and the fourth end of the rod portion 201, the distance between the fourth end of the rod portion 201 and the shaft 50 may be relatively large when the auxiliary structure is in the unfolded state, such that an area of the flexible display panel in the unrolled state increases to increase a size of a display area of the flexible display panel.

In an embodiment, when the auxiliary structure 20 is in the unfolded state, the shaft 50 is pressed against the end of the strip-shaped slot close to the third end. In this way, the distance between the fourth end of the rod portion 201 and the shaft 50 may be maximized.

In an embodiment, a distance between the end of the strip-shaped slot away from the third end of the rod portion 201 and the fourth end of the rod portion 201 is approximately equal to a distance between the end of the strip-shaped slot away from the third end of the rod portion 201 and the third end of the rod portion 201. When the auxiliary structure 20 is in the folded state, the end of the strip-shaped slot away from the third end of the rod portion 201 is pressed against the shaft 50. Distances from the shaft 50 to two ends of the first reel 325 may be the same. In this way, when the auxiliary structure 20 is in the folded state, the distance from the third end of the rod portion 201 to the shaft 50 is equal to the distance from the fourth end of the rod portion 201 to the shaft 50, which helps to reduce the volume of the flexible display device in the rolled state.

Figure 6:
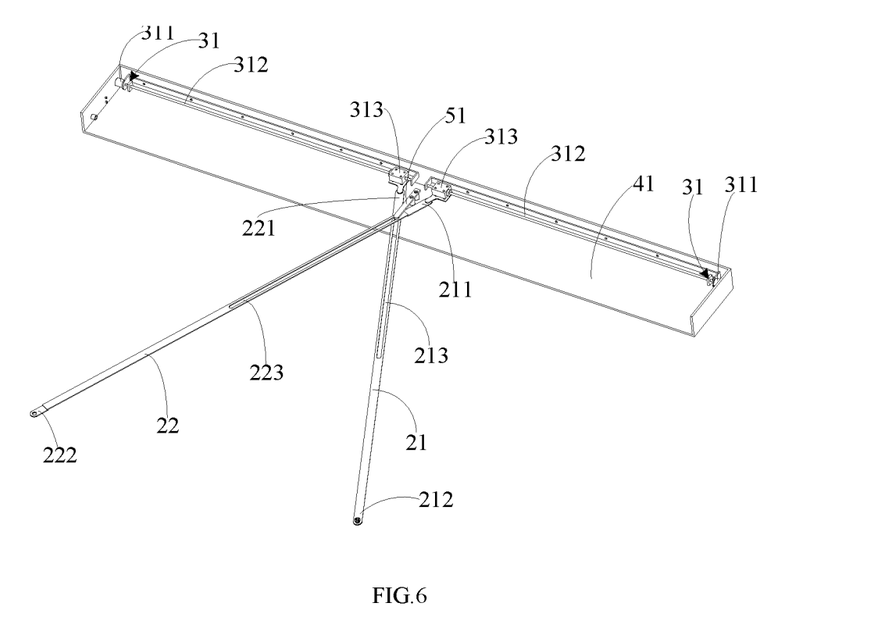
FIG. 6 is a schematic diagram of a partial structure of a flexible display device according to an exemplary embodiment of the present application.

In an embodiment, referring to FIG. 6, the auxiliary structure 20 includes a first rod portion 21 and a second rod portion 22 that cross each other. The first rod portion 21 includes a third end 211 and a fourth end 212 opposite to the third end, and the first rod portion 21 is provided with a strip-shaped slot 213. The second rod portion 22 includes a third end 221 and a fourth end 222 opposite to the third end, and the second rod portion 22 is provided with a strip-shaped slot 223. The shaft 50 passes through the strip-shaped slot 213 of the first rod portion 21 and the strip-shaped slot 223 of the second rod portion 22, and the strip-shaped slot 213 of the first rod portion 21 and the strip-shaped slot 223 of the second rod portion 22 are movable and rotatable relative to the shaft 50.

When driving the auxiliary structure 20 to switch to the folded state, the driving unit 30 drives the strip-shaped slot 213 of the first rod portion 21 and the strip-shaped slot 223 of the second rod portion 22 to rotate and move relative to the shaft 50, such that a distance between the third end 211 of the first rod portion 21 and the shaft 50 and a distance between the third end 221 of the second rod portion 22 and the shaft 50 increase, a distance between the third end 211 of the first rod portion 21 and the third end 221 of the second rod portion 22 increases, and the fourth end 212 of the first rod portion 21 and the fourth end 222 of the second rod portion 22 move close to the first end 11.

When driving the auxiliary structure 20 to switch to the unfolded state, the driving unit 30 drives the strip-shaped slot 213 of the first rod portion 21 and the strip-shaped slot 223 of the second rod portion 22 to rotate and move relative to the shaft 50, such that the distance between the third end 211 of the first rod portion 21 and the shaft 50 and the distance between the third end 221 of the second rod portion 22 and the shaft 50 decrease, the distance between the third end 211 of the first rod portion 21 and the third end 221 of the second rod portion 22 decreases, and the fourth end 212 of the first rod portion 21 and the fourth end 222 of the second rod portion 22 move away from the first reel 325.

By providing the first rod portion 21 and the second rod portion 22 that cross each other, the fourth end of the first rod portion 21 and the fourth end of the second rod portion 22 are both connected with the connecting rod 321. When the auxiliary structure 20 is switched to the unfolded state, the distance between the fourth end of the first rod portion 21 and the fourth end of the second rod portion 22 decreases, and the fourth end of the first rod portion 21 and the fourth end of the second rod portion 22 together drive the connecting rod 321 to move away from the first reel 325 by substantially the same distance at both ends of the connecting rod 321, further ensuring the evenness of the flexible display panel.

In an embodiment, when the flexible display panel 10 is in the rolled state and the auxiliary structure 20 is in the folded state, the third end 211 of the first rod portion 21, the fourth end 212 of the first rod portion 21, the third end 221 of the second rod portion 22, and the fourth end 222 of the second rod portion 22 may not extend beyond the edge of the flexible display panel 10 on the same side. In this way, when the flexible display panel is in the rolled state, the flexible display device has a smaller size in the first direction, and the volume of the flexible display device is reduced.

In an embodiment, when the flexible display panel 10 is in the unrolled state and the auxiliary structure 20 is in the unfolded state, the end of the strip-shaped slot 213 of the first rod portion 21 close to the third end of the first rod portion 21 is pressed against the shaft 50, and the end of the strip-shaped slot 223 of the second rod portion 22 close to the third end of the second rod portion 22 is pressed against the shaft 50. When the flexible display panel 10 is in the rolled state and the auxiliary structure 20 is in the folded state, the end of the strip-shaped slot 213 of the first rod portion 21 away from the third end of the first rod portion 21 is pressed against the shaft 50, and the end of the strip-shaped slot 223 of the second rod portion 22 away from the third end of the second rod portion 22 is pressed against the shaft 50. This helps to prevent the strip-shaped slot 213 of the first rod portion 21 and the strip-shaped slot 223 of the second rod portion 22 from moving relative to the shaft 50, thereby avoiding an influence on the evenness of the flexible display panel due to the movement of the first rod portion 21 and the second rod portion 22 relative to the shaft 50.

Figure 7:
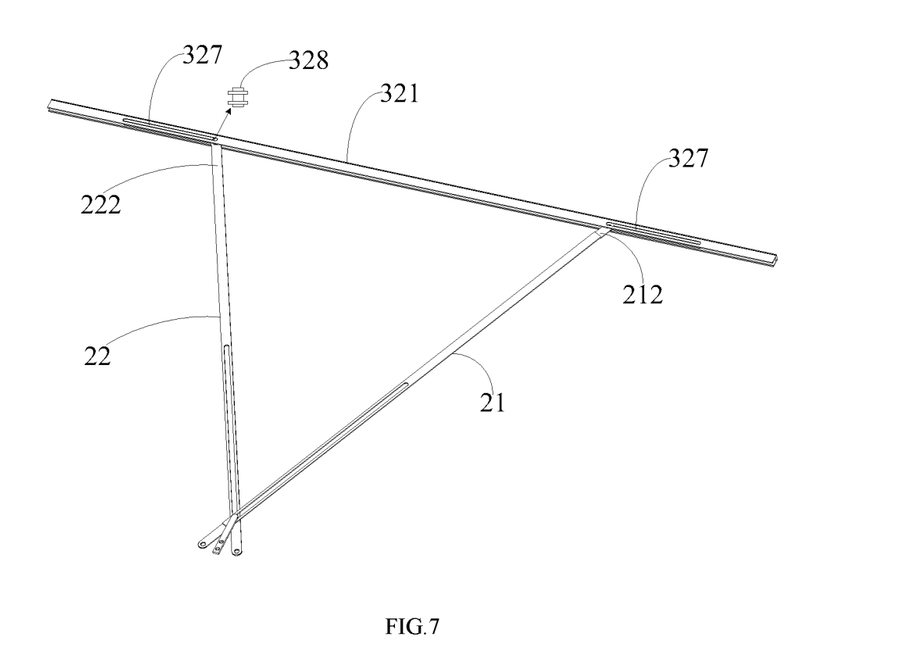
FIG. 7 is a schematic diagram of a partial structure of a flexible display device according to an exemplary embodiment of the present application.

In an embodiment, referring to FIG. 7, the connecting rod 321 is provided with two straight slots 327 arranged at intervals, and the fourth end of the first rod portion 21 is rotatably and movably connected to one straight slot 327, and the fourth end of the second rod portion 22 is rotatably and movably connected to the other straight slot 327. When the flexible display panel 10 is switched to the unrolled state and the auxiliary structure 20 is switched to the unfolded state, the fourth end 212 of the first rod portion 21 and the fourth end 222 of the second rod portion 22 drive the connecting rod 321 to move away from the first end 11, while the fourth end 212 of the first rod portion 21 and the fourth end 222 of the second rod portion 22 move and rotate in the corresponding straight slots 327, such that the distance between the fourth end 212 of the first rod portion 21 and the fourth end 222 of the second rod portion 22 decreases.

In an embodiment, the fourth end of the first rod portion 21 and the fourth end of the second rod portion 22 are each connected with the connecting rod 321 through a connecting structure 328. The connecting structure 328 includes a connecting post and two limiting stoppers provided on the connecting post. The connecting rod 321 has a hollow structure and is open on a side toward the first reel. The fourth end of the first rod portion 21 and the fourth end of the second rod portion 22 are inserted into the connecting rod 321 through the opening in the connecting rod 321. The connecting post of the connecting structure 328 passes through the straight slot 327 and a mounting hole provided on the fourth end of the first rod portion 21, and both ends of the connecting post are exposed with the two limiting stoppers respectively provided on the connecting post on both sides of the connecting rod 321. The connecting post is movable and rotatable in the straight slot 327, such that the connecting structure 328 connects the fourth end of the first rod portion 21 with the connecting rod 321, and the fourth end of the first rod portion 21 is rotatable and movable relative to the connecting rod 321. The fourth end of the second rod portion 22 is connected with the connecting rod 321 through the connecting structure 328 in the same manner.

In an embodiment, referring to FIG. 5 and FIG. 6 again, the driving unit 30 includes a first motor 311, a transmission member 312 and a connector 313, the connector 313 is rotatably connected with the third end of the rod portion 201, and the connector 313 is cooperated with the transmission member 312. The first motor 311 drives the transmission member 312 to rotate, and the transmission member 312 drives the connector 313 to move relative to the shaft 50, such that the connector 313 drives the third end of the rod portion 201 to move relative to the shaft 50. In detail, the connector 313 drives the third end of the rod portion 201 to move and rotate relative to the shaft 50.

In an embodiment, the transmission member 312 is a screw rod, which extends in a direction substantially flush with an extension direction of the first end 11. The connector 313 may be threadedly connected with the screw rod. The first motor 311 drives the screw rod to rotate, and the rotation of the screw rod drives the connector 313 to move along the screw rod, thereby driving the third end of the rod portion 201 to rotate relative to the shaft 50.

In an embodiment, the driving unit 30 includes two sub-drive assemblies 31, one of which drives the first rod portion 21 to move, and the other drives the second rod portion 22 to move. Each sub-drive assembly 31 includes the first motor 311, the transmission member 312 and the connector 313.

In an embodiment, the first motor 311 and the transmission member 312 are fixed on an inner wall of the first housing 41. This may prevent movement of the first motor 311 and the transmission member 312 from affecting the operation of the flexible display device.

In an embodiment, the driving unit 30 includes a power assembly 32 connected with the first reel 325 to drive the first reel 325 to rotate. An end of the auxiliary structure 20 and the second end 12 are each connected with the connecting rod 321.

Figure 8:
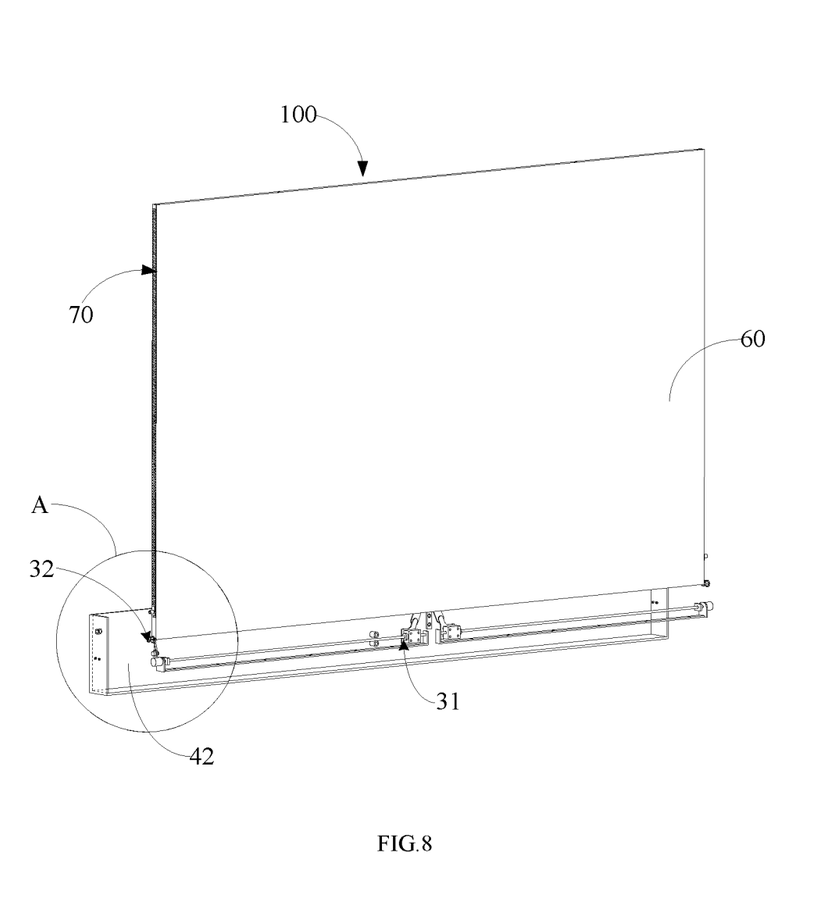
FIG. 8 is a schematic diagram of a partial structure of a flexible display device according to an exemplary embodiment of the present application.
Figure 9:
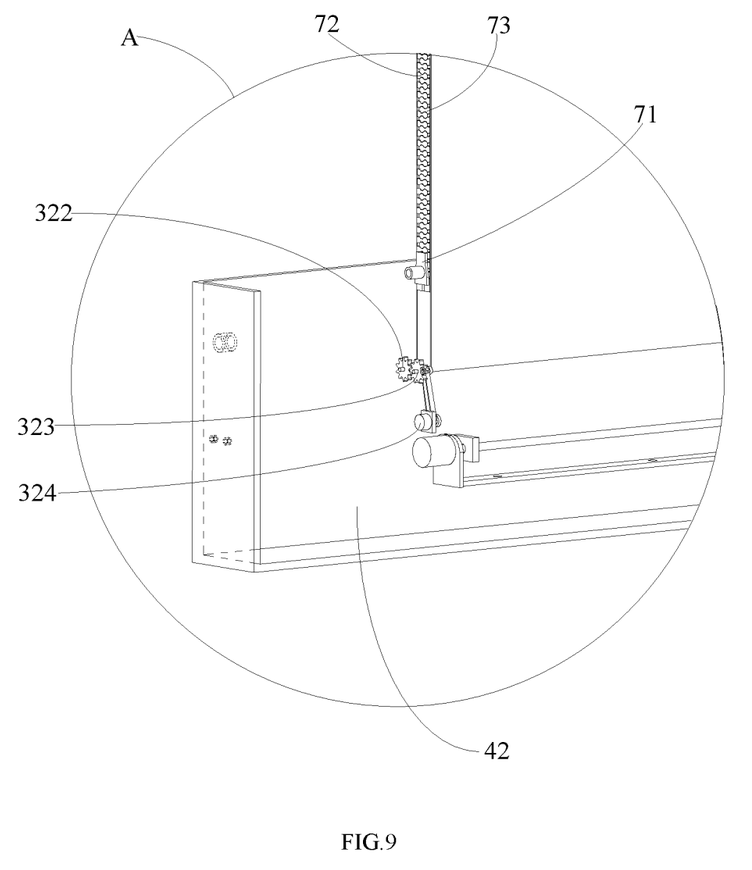
FIG. 9 is an enlarged view of an area A in FIG. 8.

In an embodiment, referring to FIGS. 5, 8 and 9, the power assembly 32 includes a second motor 324. The second motor 324 rotates the first reel 325, to wind the flexible display panel 10 in the unrolled state around the first reel 325, or unwind the flexible display panel 10 wound around the first reel 325 from the first reel 325.

In this way, the power assembly has a relatively simple structure and is easy to implement.

In an embodiment, the flexible display device further includes a flexible backplane 60 having an unrolled state and a rolled state. The driving unit 30 drives the flexible backplane 60 to switch between the rolled state and the unrolled state. When the flexible backplane 60 and the flexible display panel 10 are in the unrolled state, the auxiliary structure 20 is located between the flexible backplane 60 and the flexible display panel 10. By providing the flexible backplane 60, when the flexible display panel 10 and the flexible backplane 60 are in the unrolled state, the auxiliary structure 20 is located between the flexible backplane 60 and the flexible display panel 10, and the auxiliary structure 20 is not exposed to the outside, which can improve the aesthetics of the flexible display device and improve the user experience. The driving unit 30 may simultaneously drive the flexible display panel 10 and the flexible backplane 60 to switch to the rolled state, and the arrangement of the flexible backplane 60 may not increase the volume of the flexible display device.

In an embodiment, when the flexible backplane 60 is in the rolled state, the flexible backplane 60 is accommodated in the accommodating unit 40.

In an embodiment, the power assembly 32 simultaneously drives the flexible display panel 10 and the flexible backplane 60 to switch between the unrolled state and the rolled state. The flexible display device further includes a second reel 326. The second reel 326 is accommodated in the accommodating unit 40. The power assembly 32 further includes a first gear 322 and a second gear 323, and an end of the flexible backplane 60 is connected with the second reel 326. The first gear 322 engages with the second gear 323, the first gear 322 drives the first reel 325 to rotate, and the second gear 323 drives the second reel 326 to rotate. The second motor 324 drives one of the first gear 322 and the second gear 323 to rotate.

Since the first gear 322 engages with the second gear 323, when the second motor 324 drives one of the first and second gears to rotate, the gear drives the other gear to rotate, and the first gear 322 and the second gear 323 rotate in opposite directions. In the illustrated embodiment, the second motor 324 is connected with the second gear 323 through a conveyor belt, the second motor 324 drives the second gear 323 to rotate through the conveyor belt, and the rotation of the second gear 323 drives the first gear 322 to rotate. In other embodiments, the second motor 324 may rotate the first gear 322 through the conveyor belt.

When the second motor 324 is in operation, the first gear 322 and the second gear 323 rotate, to drive the first reel 325 and the second reel 326 to rotate, to wind the flexible display panel 10 in the unrolled state around the first reel 325, and to wind the flexible backplane 60 in the unrolled state around the second reel 326, or to unwind the flexible display panel 10 wound around the first reel 325, and to unwind the flexible backplane 60 wound around the second reel 326.

In this way, a single second motor 324 may drive both the flexible backplane 60 and the flexible display panel 10 to unroll or roll simultaneously, which can simplify the structural complexity of the driving unit 30 and reduce the cost of the flexible display device.

In an embodiment, the flexible display device may be provided with two first gears 322 and two second gears 323. The two first gears 322 are respectively connected to both ends of the first reel 325, and the two second gears 323 are respectively connected to both ends of the second reel 326. An extension direction of the first reel 325 may be the same as that of the second reel 326.

In an embodiment, the second motor 324, the first gear 322 and the second gear 323 may be fixedly mounted on an inner wall of the second housing 42 to prevent the second motor 324, the first gear 322 and the second gear 323 from moving relative to the second housing 42.

In an embodiment, when the flexible display panel is driven to switch to the rolled state and the auxiliary structure 20 is driven to switch to the folded state, the operation time of the first motor 311 and the second motor 324 may be controlled such that the operation time of the first motor 311 is slightly earlier than the operation time of the second motor 324. In this way, the connecting rod 321 first moves close to the first reel 325, and then the first reel 325 rotates to rotate the flexible display panel, such that the connecting rod 321 applies a tensile force to the second end of the flexible display panel 10, to ensure the evenness of each part of the flexible display panel when in the rolled state, and to prevent the flexible display panel from wrinkling.

In an embodiment, one end of the flexible backplane 60 is connected to the second reel 326, and the other end of the flexible backplane 60 is connected to the connecting rod 321. The flexible backplane 60 may be bonded to a side of the connecting rod 321 by an adhesive material. In this way, when the fourth ends of the first rod portion 21 and the second rod portion 22 move away from the flexible display panel 10, the flexible backplane 60 is driven to move, such that the flexible backplane 60 may be smoothly unrolled to prevent the flexible backplane 60 from wrinkling.

In an embodiment, referring to FIG. 8 and FIG. 9 again, the flexible display device 100 further includes zipper assemblies 70 respectively provided on opposite sides of the flexible display panel. The zipper assembly 70 includes a first zipper chain 72, a second zipper chain 73, and a fixed lock catch 71, the first zipper chain 72 is disposed on a side edge of the flexible display panel 10, and the second zipper chain 73 is disposed on a side edge of the flexible backplane 60.

When simultaneously driving the flexible display panel 10 and the flexible backplane 60 to switch from the unrolled state to the rolled state, the driving unit 30 drives the first zipper chain 72 and the second zipper chain 73 to roll so as to move relative to the lock catch 71, such that the lock catch 71 separates the first zipper chain 72 and the second zipper chain 73 in a fastened state. When simultaneously driving the flexible display panel 10 and the flexible backplane 60 to switch from the rolled state to the unrolled state, the driving unit 30 drives the first zipper chain 72 and the second zipper chain 73 in a rolled state to unroll so as to move relative to the lock catch 71, such that the lock catch 71 fastens the first zipper chain 72 and the second zipper chain 73.

In this way, when the flexible display panel 10 and the flexible backplane 60 are unrolled, the first zipper chain 72 and the second zipper chain 73 are fastened together to connect side edges of the flexible display panel 10 and the flexible backplane 60 on the same side. In this case, the flexible display device appears to be a complete structure, and a user may not see the auxiliary structure 20 through the side edges, which can improve the aesthetics of the flexible display device 100 and improve the user experience. When the flexible display panel 10 and the flexible backplane 60 are rolled, the first zipper chain 72 and the second zipper chain 73 are rolled and accommodated in the accommodating unit 40 without being exposed from the accommodating unit 40.

In an embodiment, the lock catch 71 may be fixedly provided on the inner wall of the second housing 42. In this way, the lock catch 71 is fixed, while the first zipper chain 72 and the second zipper chain 73 move, and when the first zipper chain 72 and the second zipper chain 73 pass through the lock catch 71, the lock catch 71 causes the first zipper chain 72 and the second zipper chain 73 to fasten together or separate from each other.

Figure 10:
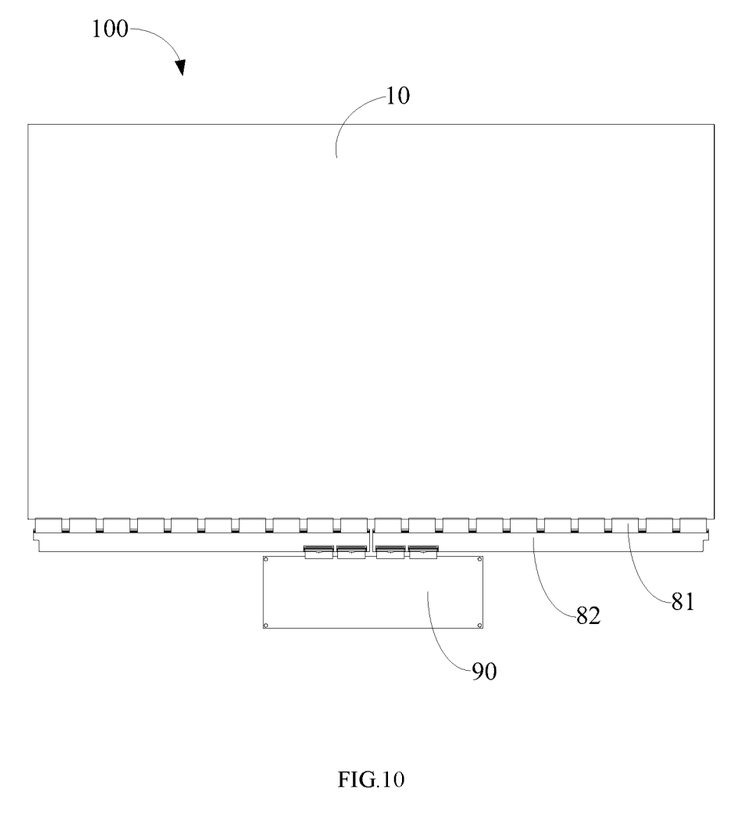
FIG. 10 is a schematic structural diagram of a flexible display device according to an exemplary embodiment of the present application.

In an embodiment, referring to FIG. 10, the flexible display device further includes a chip on film (COF) 81, a printed circuit board (PCB) 82 and a control circuit board 90. One end of the chip on film 81 is electrically connected with the flexible display panel, the other end is electrically connected to one end of the printed circuit board 82, and the other end of the printed circuit board 82 is electrically connected with the control circuit board 90. The chip on film 81, the printed circuit board 82 and the control circuit board 90 are accommodated in the accommodating unit 40.

The flexible display device according to embodiments of the present application may include, for example, any device with a display function, such as mobile phone, tablet computer, TV set, notebook computer, and vehicle-mounted device.

It should be noted that, sizes of layers and regions may be exaggerated in the drawings for clarity of illustration. Also, it may be understood that when an element or layer is referred to as being "on" another element or layer, it may be directly on the other element or intervening layers may be present. In addition, it may be understood that when an element or layer is referred to as being "under" another element or layer, it may be directly under the other element, or more than one intervening layer or element may be present. In addition, it may be understood that when a layer or element is referred to as being "between" two layers or elements, it may be the only layer between the two layers or elements, or more than one intervening layer or element may be present. Like reference numerals indicate like elements throughout.

Other embodiments of the present application may readily occur to those skilled in the art upon consideration of the specification and practice of the disclosure disclosed herein. The present application is intended to cover any modifications, uses, or adaptations thereof that follow the general principles of the present application and include common general knowledge or commonly used technical means in the art that are not disclosed in the present application. The specification and embodiments are to be considered exemplary only, with the true scope and spirit of the present application being indicated by the following claims.

It should be understood that the present application is not limited to the precise structures described above and illustrated in the drawings, and that various modifications and changes may be made without departing from the scope thereof. The scope of the present application is limited only by the appended claims.

The invention claimed is:

1. A flexible display device, comprising:
   a flexible display panel having an unrolled state and a rolled state, the flexible display panel comprising a first end and a second end opposite to the first end;
   an auxiliary structure having an unfolded state and a folded state, the auxiliary structure comprising a third end and a fourth end opposite to the third end, and the fourth end being connected with the second end;
   a first reel, connected with the first end; and
   a driving unit, wherein
   when driving the flexible display panel to switch from the unrolled state to the rolled state and driving the auxiliary structure to switch from the unfolded state to the folded state, the driving unit drives the fourth end to move close to the first reel, and drives the first reel to rotate to drive the second end to move close to the first reel and to wind the flexible display panel around the first reel; and
   when driving the flexible display panel to switch from the rolled state to the unrolled state and driving the auxiliary structure to switch from the folded state to the unfolded state, the driving unit drives the first reel to rotate to unwind the flexible display panel wound around the first reel from the first reel, and drives the fourth end to move away from the first end to drive the second end to move away from the first reel,
   wherein the auxiliary structure comprises a rod portion, the flexible display device further comprises a fixed shaft, and the rod portion is rotatable around the shaft; and when driving the auxiliary structure to switch to the unfolded state, the driving unit drives the rod portion to rotate around the shaft to move a fourth end of the rod portion away from the first reel; and when driving the auxiliary structure to switch to the folded state, the driving unit drives the rod portion to rotate around the shaft to move the fourth end of the rod portion close to the first reel, and
   wherein the rod portion is provided with a strip-shaped slot, the shaft passes through the strip-shaped slot, and the strip-shaped slot is movable and rotatable relative to the shaft; when driving the auxiliary structure to switch to the folded state, the driving unit drives the strip-shaped slot to rotate and move relative to the shaft to increase a distance between a third end of the rod portion and the shaft, so as to drive the fourth end of the rod portion to move close to the first reel; and when driving the auxiliary structure to switch to the unfolded state, the driving unit drives the strip-shaped slot to rotate and move relative to the shaft to decrease the distance between the third end of the rod portion and the shaft, so as to drive the fourth end of the rod portion to move away from the first reel.

2. The flexible display device according to claim 1, wherein the flexible display device further comprises a connecting rod provided with a straight slot, and the fourth end of the rod portion is movably and rotatably connected with the straight slot; and the second end is connected with the connecting rod, and the fourth end of the rod portion is connected with the second end through the connecting rod; and
   when the fourth end of the rod portion moves away from or close to the first reel, the fourth end of the rod portion moves and rotates relative to the straight slot, to drive the connecting rod to move away from or close to the first reel.

3. The flexible display device according to claim 1, wherein in an extension direction of the rod portion, a distance between an end of the strip-shaped slot close to the third end of the rod portion and the third end of the rod portion is smaller than a distance between an end of the strip-shaped slot away from the third end of the rod portion and the fourth end of the rod portion.

4. The flexible display device according to claim 1, wherein the rod portion comprises a first rod portion and a second rod portion that cross each other, and the shaft passes through the strip-shaped slot of the first rod portion and the strip-shaped slot of the second rod portion;
   when driving the auxiliary structure to switch to the folded state, the driving unit drives the strip-shaped slot of the first rod portion and the strip-shaped slot of the second rod portion to rotate and move relative to the shaft to increase a distance between a third end of the first rod portion and the shaft, a distance between a third end of the second rod portion and the shaft, and a distance between the third end of the first rod portion and the third end of the second rod portion, so as to drive a fourth end of the first rod portion and a fourth end of the second rod portion to move close to the first reel; and
   when driving the auxiliary structure to switch to the unfolded state, the driving unit drives the strip-shaped slot of the first rod portion and the strip-shaped slot of the second rod portion to rotate and move relative to the shaft to decrease the distance between the third end of the first rod portion and the shaft, the distance between the third end of the second rod portion and the shaft, and the distance between the third end of the first rod portion and the third end of the second rod portion, so as to drive the fourth end of the first rod portion and the fourth end of the second rod portion to move away from the first reel.

5. The flexible display device according to claim 1, wherein the driving unit comprises a first motor, a transmission member and a connector, the connector is rotatably connected with the third end of the rod portion, and the connector is cooperated with the transmission member; and
   the first motor drives the transmission member to rotate, the transmission member drives the connector to move relative to the shaft, and the connector drives the third end of the rod portion to move relative to the shaft.

6. The flexible display device according to claim 1, wherein the flexible display device further comprises an accommodating unit, in which the shaft, the first reel, and the third end are accommodated; and
   the flexible display device further comprises a jointing rod that is fixedly connected with the shaft, and the shaft is fixedly mounted in the accommodating unit through the jointing rod; and at least two mounting holes are provided in the jointing rod, the flexible display device further comprises connecting pieces corresponding to the mounting holes one-to-one, and each of the connecting pieces passes through a respective mounting hole to fix the jointing rod in the accommodating unit.

7. The flexible display device according to claim 1, wherein the flexible display device further comprises a flexible backplane having an unrolled state and a rolled state; and the driving unit drives the flexible backplane to switch between the rolled state and the unrolled state; and when the flexible backplane and the flexible display panel are in the unrolled state, the auxiliary structure is located between the flexible backplane and the flexible display panel.

8. The flexible display device according to claim 7, wherein the flexible display device further comprises a second reel, and the driving unit comprises a power assembly comprising a second motor, a first gear, and a second gear; an end of the flexible backplane is connected with the second reel; the first gear engages with the second gear, the first gear drives the first reel to rotate, and the second gear drives the second reel to rotate; and the second motor drives one of the first gear and the second gear to rotate; and the second motor operates to drive the first gear and the second gear to rotate, and in turn drive the first reel and the second reel to rotate, to wind the flexible display panel in the unrolled state around the first reel, and to wind the flexible backplane in the unrolled state around the second reel, or to unwind the flexible display panel wound around the first reel from the first reel, and to unwind the flexible backplane wound around the second reel from the second reel.

9. The flexible display device according to claim 7, wherein the flexible display device further comprises zipper assemblies respectively provided on opposite sides of the flexible display panel; each of the zipper assemblies comprises a first zipper chain, a second zipper chain, and a fixed lock catch, the first zipper chain is disposed on a side edge of the flexible display panel, and the second zipper chain is disposed on a side edge of the flexible backplane;

when simultaneously driving the flexible display panel and the flexible backplane to switch from the unrolled state to the rolled state, the driving unit drives the first zipper chain and the second zipper chain to roll so as to move relative to the lock catch, such that the lock catch separates the first zipper chain and the second zipper chain in a fastened state; and when simultaneously driving the flexible display panel and the flexible backplane to switch from the rolled state to the unrolled state, the driving unit drives the first zipper chain and the second zipper chain in a rolled state to unroll so as to move relative to the lock catch, such that the lock catch fastens the first zipper chain and the second zipper chain.

10. The flexible display device according to claim 1, wherein the flexible display device further comprises an accommodating unit, in which the first reel and the third end are accommodated; and when the flexible display panel is in the rolled state and the auxiliary structure is in the folded state, the flexible display panel, the driving unit and the auxiliary structure are accommodated in the accommodating unit; and when the flexible display panel is in the unrolled state and the auxiliary structure is in the unfolded state, the flexible display panel and the auxiliary structure are at least partially exposed from the accommodating unit, and the driving unit is accommodated in the accommodating unit.

* * * * *